(12) United States Patent
Sturman

(10) Patent No.: US 8,887,690 B1
(45) Date of Patent: Nov. 18, 2014

(54) AMMONIA FUELED MOBILE AND STATIONARY SYSTEMS AND METHODS

(75) Inventor: Oded Eddie Sturman, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 620 days.

(21) Appl. No.: 13/181,437

(22) Filed: Jul. 12, 2011

Related U.S. Application Data

(60) Provisional application No. 61/363,373, filed on Jul. 12, 2010.

(51) Int. Cl.
*F02B 71/00* (2006.01)

(52) U.S. Cl.
USPC .... 123/294; 123/27 R; 123/46 R; 123/46 SC; 123/568.14

(58) Field of Classification Search
CPC ... F02B 71/00; F02M 25/0752; F02D 41/006; F02D 41/0062
USPC ............. 123/27 R, 46 R, 46 SC, 294, 568.14
See application file for complete search history.

(56) References Cited

U.S. PATENT DOCUMENTS

| | | | |
|---|---|---|---|
| 1,062,999 | A | 5/1913 | Webb |
| 2,058,705 | A | 10/1936 | Maniscalco |
| 2,661,592 | A | 12/1953 | Bright |
| 2,902,207 | A | 9/1959 | Burion |
| 3,065,703 | A | 11/1962 | Harman |
| 3,170,406 | A | 2/1965 | Robertson |
| 3,209,737 | A | 10/1965 | Omotehara et al. |
| 3,532,121 | A | 10/1970 | Sturman et al. |
| 3,623,463 | A | 11/1971 | De Vries |
| 3,683,239 | A | 8/1972 | Sturman |
| 3,743,898 | A | 7/1973 | Sturman |

(Continued)

FOREIGN PATENT DOCUMENTS

| | | |
|---|---|---|
| CN | 101225765 | 7/2008 |
| CN | 101495730 | 7/2009 |

(Continued)

OTHER PUBLICATIONS

"International Search Report and Written Opinion of the International Searching Authority Dated Sep. 12, 2007", International Application No. PCT/US2007/009655.

(Continued)

*Primary Examiner* — Erick Solis
(74) *Attorney, Agent, or Firm* — Blakely Sokoloff Taylor & Zafman LLP

(57) ABSTRACT

A piston engine is operated to close an exhaust valve, close an intake valve, and inject ammonia into a cylinder at a start of a compression motion of a piston before substantial compression occurs. The ammonia may be injected into the cylinder as a liquid. The ammonia may be pressurized sufficiently to prevent boiling of the ammonia at a temperature of the engine. A mixture of ammonia and air may be compressed sufficiently to obtain compression ignition of the ammonia. An amount of air in the cylinder during compression may be limited to limit combustion temperatures to below the temperatures for formation of $NO_x$. Air may be injected into the cylinder after ignition of the ammonia and during combustion. The exhaust valve may be closed at a time to trap a predetermined amount of exhaust gas in the cylinder.

18 Claims, 7 Drawing Sheets

(56) References Cited

U.S. PATENT DOCUMENTS

| | | |
|---|---|---|
| 3,859,966 A | 1/1975 | Braun |
| 3,952,710 A | 4/1976 | Kawarada et al. |
| 3,995,974 A | 12/1976 | Herron |
| 4,009,695 A | 3/1977 | Ule |
| 4,097,198 A | 6/1978 | Herron |
| 4,162,662 A | 7/1979 | Melchior |
| 4,192,265 A | 3/1980 | Amano |
| 4,312,038 A | 1/1982 | Imai et al. |
| 4,326,380 A | 4/1982 | Rittmaster et al. |
| 4,333,424 A | 6/1982 | McFee |
| 4,396,037 A | 8/1983 | Wilcox |
| 4,403,474 A | 9/1983 | Ruthven |
| 4,409,638 A | 10/1983 | Sturman et al. |
| 4,435,133 A | 3/1984 | Meulendyk |
| RE32,163 E | 5/1986 | Tokuda et al. |
| 4,599,861 A | 7/1986 | Beaumont |
| 4,779,582 A | 10/1988 | Lequesne |
| 4,783,966 A | 11/1988 | Aldrich |
| 4,887,562 A | 12/1989 | Wakeman |
| 4,906,924 A | 3/1990 | Zannis |
| 4,930,464 A | 6/1990 | Letsche |
| 5,003,937 A | 4/1991 | Matsumoto et al. |
| 5,022,358 A | 6/1991 | Richeson |
| 5,121,730 A | 6/1992 | Ausman et al. |
| 5,124,598 A | 6/1992 | Kawamura |
| 5,170,755 A | 12/1992 | Kano et al. |
| 5,193,495 A | 3/1993 | Wood, III |
| 5,209,453 A | 5/1993 | Aota et al. |
| 5,224,683 A | 7/1993 | Richeson |
| 5,237,968 A | 8/1993 | Miller et al. |
| 5,237,976 A | 8/1993 | Lawrence et al. |
| 5,248,123 A | 9/1993 | Richeson et al. |
| 5,255,641 A | 10/1993 | Schechter |
| 5,275,134 A | 1/1994 | Springer |
| 5,275,136 A | 1/1994 | Schechter et al. |
| 5,327,856 A | 7/1994 | Schroeder et al. |
| 5,331,277 A | 7/1994 | Burreson |
| 5,335,633 A | 8/1994 | Thien |
| 5,339,777 A | 8/1994 | Cannon |
| 5,363,651 A | 11/1994 | Knight |
| 5,367,990 A | 11/1994 | Schechter |
| 5,373,817 A | 12/1994 | Schechter et al. |
| 5,408,975 A | 4/1995 | Blakeslee et al. |
| 5,410,994 A | 5/1995 | Schechter |
| 5,419,286 A * | 5/1995 | Edison et al. .................. 123/1 A |
| 5,419,492 A | 5/1995 | Gant et al. |
| 5,421,521 A | 6/1995 | Gibson et al. |
| 5,448,973 A | 9/1995 | Meyer |
| 5,460,329 A | 10/1995 | Sturman |
| 5,463,996 A | 11/1995 | Maley et al. |
| 5,471,959 A | 12/1995 | Sturman |
| 5,473,893 A | 12/1995 | Achten et al. |
| 5,482,445 A | 1/1996 | Achten et al. |
| 5,494,219 A | 2/1996 | Maley et al. |
| 5,499,605 A | 3/1996 | Thring |
| 5,507,316 A | 4/1996 | Meyer |
| 5,526,778 A | 6/1996 | Springer |
| 5,540,193 A | 7/1996 | Achten et al. |
| 5,546,897 A | 8/1996 | Brackett |
| 5,551,398 A | 9/1996 | Gibson et al. |
| 5,556,262 A | 9/1996 | Achten et al. |
| 5,572,961 A | 11/1996 | Schechter et al. |
| 5,577,468 A | 11/1996 | Weber |
| 5,598,871 A | 2/1997 | Sturman et al. |
| 5,622,152 A | 4/1997 | Ishida |
| 5,628,293 A | 5/1997 | Gibson et al. |
| 5,638,781 A | 6/1997 | Sturman |
| 5,640,987 A | 6/1997 | Sturman |
| 5,647,734 A | 7/1997 | Milleron |
| 5,669,355 A | 9/1997 | Gibson et al. |
| 5,673,669 A | 10/1997 | Maley et al. |
| 5,682,858 A | 11/1997 | Chen et al. |
| 5,687,693 A | 11/1997 | Chen et al. |
| 5,697,342 A | 12/1997 | Anderson et al. |
| 5,700,136 A | 12/1997 | Sturman |
| 5,713,316 A | 2/1998 | Sturman |
| 5,720,261 A | 2/1998 | Sturman et al. |
| 5,732,677 A | 3/1998 | Baca |
| 5,738,075 A | 4/1998 | Chen et al. |
| 5,752,659 A | 5/1998 | Moncelle |
| 5,813,841 A | 9/1998 | Sturman |
| 5,829,393 A | 11/1998 | Achten et al. |
| 5,829,396 A | 11/1998 | Sturman |
| 5,857,436 A | 1/1999 | Chen |
| 5,873,526 A | 2/1999 | Cooke |
| 5,894,730 A | 4/1999 | Mitchell |
| 5,937,799 A | 8/1999 | Binion |
| 5,954,030 A | 9/1999 | Sturman et al. |
| 5,960,753 A | 10/1999 | Sturman |
| 5,970,956 A | 10/1999 | Sturman |
| 5,979,803 A | 11/1999 | Peters et al. |
| 5,983,638 A | 11/1999 | Achten et al. |
| 6,005,763 A | 12/1999 | North |
| 6,012,430 A | 1/2000 | Cooke |
| 6,012,644 A | 1/2000 | Sturman et al. |
| 6,085,991 A | 7/2000 | Sturman |
| 6,105,616 A | 8/2000 | Sturman et al. |
| 6,109,284 A | 8/2000 | Johnson et al. |
| 6,135,069 A | 10/2000 | Fenelon et al. |
| 6,148,778 A | 11/2000 | Sturman |
| 6,152,091 A | 11/2000 | Bailey et al. |
| 6,158,401 A | 12/2000 | Bailey |
| 6,161,770 A | 12/2000 | Sturman |
| 6,170,442 B1 | 1/2001 | Beale |
| 6,173,685 B1 | 1/2001 | Sturman |
| 6,206,656 B1 | 3/2001 | Bailey et al. |
| 6,257,499 B1 | 7/2001 | Sturman |
| 6,269,783 B1 | 8/2001 | Bailey |
| 6,279,517 B1 | 8/2001 | Achten |
| 6,308,690 B1 | 10/2001 | Sturman |
| 6,314,924 B1 | 11/2001 | Berlinger |
| 6,360,728 B1 | 3/2002 | Sturman |
| 6,412,706 B1 | 7/2002 | Guerrassi et al. |
| 6,415,749 B1 | 7/2002 | Sturman et al. |
| 6,463,895 B2 | 10/2002 | Bailey |
| 6,497,216 B2 | 12/2002 | Gaessler et al. |
| 6,543,411 B2 | 4/2003 | Raab et al. |
| 6,551,076 B2 | 4/2003 | Boulware |
| 6,557,506 B2 | 5/2003 | Sturman |
| 6,575,126 B2 | 6/2003 | Sturman |
| 6,575,384 B2 | 6/2003 | Ricco |
| 6,592,050 B2 | 7/2003 | Boecking |
| 6,655,355 B2 | 12/2003 | Kropp et al. |
| 6,684,856 B2 | 2/2004 | Tanabe et al. |
| 6,684,857 B2 | 2/2004 | Boecking |
| 6,739,293 B2 | 5/2004 | Turner et al. |
| 6,769,405 B2 | 8/2004 | Leman et al. |
| 6,863,507 B1 | 3/2005 | Schaeffer et al. |
| 6,910,462 B2 | 6/2005 | Sun et al. |
| 6,910,463 B2 | 6/2005 | Oshizawa et al. |
| 6,925,971 B1 * | 8/2005 | Peng et al. .................. 123/46 R |
| 6,931,845 B2 | 8/2005 | Schaeffer |
| 6,948,459 B1 | 9/2005 | Laumen et al. |
| 6,951,204 B2 | 10/2005 | Shafer et al. |
| 6,951,211 B2 | 10/2005 | Bryant |
| 6,953,010 B1 | 10/2005 | Hofbauer |
| 6,957,632 B1 | 10/2005 | Carlson |
| 6,971,341 B1 | 12/2005 | Fuqua et al. |
| 6,983,724 B2 | 1/2006 | Carlson |
| 6,994,077 B2 | 2/2006 | Kobayashi et al. |
| 6,999,869 B1 | 2/2006 | Gitlin et al. |
| 7,025,326 B2 | 4/2006 | Lammert et al. |
| 7,032,548 B2 | 4/2006 | Tusinean |
| 7,032,574 B2 | 4/2006 | Sturman |
| 7,108,200 B2 | 9/2006 | Sturman |
| 7,128,062 B2 | 10/2006 | Kuo et al. |
| 7,182,068 B1 | 2/2007 | Sturman et al. |
| 7,258,086 B2 | 8/2007 | Fitzgerald |
| 7,341,028 B2 | 3/2008 | Klose et al. |
| 7,353,786 B2 | 4/2008 | Scuderi et al. |
| 7,387,095 B2 | 6/2008 | Babbitt et al. |
| 7,412,969 B2 | 8/2008 | Pena et al. |
| 7,481,039 B2 | 1/2009 | Surnilla et al. |
| 7,568,632 B2 | 8/2009 | Sturman |

(56) References Cited

U.S. PATENT DOCUMENTS

| | | | |
|---|---|---|---|
| 7,568,633 | B2 | 8/2009 | Sturman |
| 7,694,891 | B2 | 4/2010 | Sturman |
| 7,717,359 | B2 | 5/2010 | Sturman |
| 7,730,858 | B2 | 6/2010 | Babbitt et al. |
| 7,793,638 | B2 | 9/2010 | Sturman |
| 7,954,472 | B1 | 6/2011 | Sturman |
| 7,958,864 | B2 | 6/2011 | Sturman |
| 8,196,844 | B2 | 6/2012 | Kiss et al. |
| 8,276,550 | B1* | 10/2012 | Noguchi et al. ............... 123/1 A |
| 8,282,020 | B2 | 10/2012 | Kiss et al. |
| 8,327,831 | B2* | 12/2012 | Sturman ....................... 123/525 |
| 8,342,153 | B2 | 1/2013 | Sturman |
| 8,499,728 | B2 | 8/2013 | Xie et al. |
| 8,549,854 | B2* | 10/2013 | Dion et al. ................... 60/605.2 |
| 2001/0017123 | A1 | 8/2001 | Raab et al. |
| 2001/0020453 | A1 | 9/2001 | Bailey |
| 2002/0017573 | A1 | 2/2002 | Sturman |
| 2002/0073703 | A1 | 6/2002 | Bailey |
| 2002/0076339 | A1 | 6/2002 | Boulware |
| 2002/0166515 | A1 | 11/2002 | Ancimer et al. |
| 2003/0015155 | A1 | 1/2003 | Turner et al. |
| 2003/0041593 | A1 | 3/2003 | Yoshida et al. |
| 2003/0226351 | A1 | 12/2003 | Glenn |
| 2004/0045536 | A1 | 3/2004 | Hafner et al. |
| 2004/0177837 | A1 | 9/2004 | Bryant |
| 2005/0098162 | A1 | 5/2005 | Bryant |
| 2005/0247273 | A1 | 11/2005 | Carlson |
| 2006/0032940 | A1 | 2/2006 | Boecking |
| 2006/0192028 | A1 | 8/2006 | Kiss |
| 2006/0243253 | A1 | 11/2006 | Knight |
| 2007/0007362 | A1 | 1/2007 | Sturman |
| 2007/0113906 | A1 | 5/2007 | Sturman et al. |
| 2007/0245982 | A1 | 10/2007 | Sturman |
| 2008/0092860 | A2 | 4/2008 | Bryant |
| 2008/0264393 | A1 | 10/2008 | Sturman |
| 2008/0275621 | A1 | 11/2008 | Kobayashi |
| 2009/0037085 | A1 | 2/2009 | Kojima |
| 2009/0183699 | A1 | 7/2009 | Sturman |
| 2009/0199789 | A1 | 8/2009 | Beard |
| 2009/0199819 | A1 | 8/2009 | Sturman |
| 2009/0250035 | A1 | 10/2009 | Washko |
| 2009/0271088 | A1 | 10/2009 | Langham |
| 2010/0012745 | A1 | 1/2010 | Sturman |
| 2010/0186716 | A1 | 7/2010 | Sturman |
| 2010/0275884 | A1 | 11/2010 | Gray, Jr. |
| 2010/0277265 | A1 | 11/2010 | Sturman et al. |
| 2010/0288249 | A1* | 11/2010 | Sasaki et al. ................... 123/575 |
| 2010/0307432 | A1 | 12/2010 | Xie et al. |
| 2011/0011354 | A1* | 1/2011 | Dincer et al. ..................... 123/3 |
| 2011/0083643 | A1 | 4/2011 | Sturman et al. |
| 2011/0163177 | A1 | 7/2011 | Kiss |
| 2012/0080110 | A1 | 4/2012 | Kiss et al. |

FOREIGN PATENT DOCUMENTS

| | | |
|---|---|---|
| DE | 37 27 335 | 2/1988 |
| DE | 10239110 | 3/2004 |
| FR | 2901846 | 12/2007 |
| GB | 941453 | 11/1963 |
| GB | 2402169 | 12/2004 |
| JP | 60-035143 | 2/1985 |
| WO | WO-92/02730 | 2/1992 |
| WO | WO-93/10344 | 5/1993 |
| WO | WO-97/35104 | 9/1997 |
| WO | WO-98/11334 | 3/1998 |
| WO | WO-98/54450 | 12/1998 |
| WO | WO-01/46572 | 6/2001 |
| WO | WO-02/086297 | 10/2002 |
| WO | WO-2008/014399 | 1/2008 |

OTHER PUBLICATIONS

"International Search Report and Written Opinion of the International Searching Authority Dated Jan. 20, 2011", International Application No. PCT/US2010/052391.

Anderson, Mark D., et al., "Adaptive Lift Control for a Camless Electrohydraulic Valvetrain", SAE Paper No. 981029, U. of Illinois and Ford Motor Co., (Feb. 23, 1998).

Blair, Gordon P., "Design and Simulation of Two-Stroke Engines", SAE Publications No. R-161, (1996), pp. 1-48.

Challen, Bernard, "Diesel Engine Reference Book Second Edition", SAE Publication No. R-183, (1999), pp. 27-71.

Cole, C., et al., "Application of Digital Valve Technology to Diesel Fuel Injection", SAE Paper No. 1999-01-0196, Sturman Industries, Inc., (Mar. 1, 1999).

Dickey, Daniel W., et al., "NOx Control in Heavy-Duty Diesel Engines—What is the Limit?", *In-Cylinder Diesel Particulate and NOx Control*, SAE Publication No. SP-1326, (1998), pp. 9-20.

Duret, P., "A New Generation of Two-Stroke Engines for the Year 2000", *A New Generation of Two-Stroke Engines for the Future?*, Paris, (1993), pp. 181-194.

Heisler, Heinz, "Vehicle and Engine Technology Second Edition", *SAE International*, London, (1999), pp. 292-308.

Kang, Kern Y., "Characteristics of Scavenging Flow in a Poppet-Valve Type 2-Stroke Diesel Engine by Using RSSV System", *Progress in Two-Stroke Engine and Emissions Control*, SAE Publication SP-1131, (1998), pp. 93-101.

Kim, Dean H., et al., "Dynamic Model of a Springless Electrohydraulic Valvetrain", SAE Paper No. 970248, U. of Illinois and Ford Research Company, (1997).

Misovec, Kathleen M., et al., "Digital Valve Technology Applied to the Control of an Hydraulic Valve Actuator", SAE Paper No. 1999-01-0825, Sturman Industries, Inc., (Mar. 1, 1999).

Nomura, K., et al., "Development of a New Two-Stroke Engine with Poppet-Valves: Toyota S-2 Engine", A New Generation of Two-Stroke Engines for the Future?, (1993), pp. 53-62.

Nuti, Marco, et al., "Twenty Years of Piaggio Direct Injection Research to Mass Produced Solution for Small 2T SI Engines", *Two-Stroke Engines and Emissions*, SAE Publication SP-1327, (1998), pp. 65-78.

Osenga, Mike, "Cat's HEUI System: A Look at the Future?", *Diesel Progress*, (Apr. 1995), pp. 30-35.

Schechter, Michael M., et al., "Camless Engine", SAE Paper No. 960581, Ford Research Lab, (Feb. 26, 1996).

Sturman, Carol, et al., "Breakthrough in Digital Valves", *Machine Design*, (Feb. 21, 1994), pp. 37-42.

Wilson, Rob, "Developments in Digital Valve Technology", *Diesel Progress North American Edition*, (Apr. 1997), pp. 76, 78-79.

Wirbeleit, F., et al., "Stratified Diesel Fuel-Water-Diesel Fuel Injection Combined with EGR—The Most Efficient In-Cylinder NOx and PM Reduction Technology", *Combustion and Emissions in Diesel Engines*, SAE Publication No. SP-1299, (1997), pp. 39-44.

"International Search Report and Written Opinion of the International Searching Authority Dated Apr. 18, 2013, International Application No. PCT/US2012/047805", (Apr. 18, 2013).

"International Search Report and Written Opinion of the International Searching Authority Dated Jan. 31, 2013, International Application No. PCT/US2012/043393", (Jan. 31, 2013).

"Office Action Dated Apr. 12, 2013; U.S. Appl. No. 12/901,915", (Apr. 12, 2013).

"Office Action Dated Oct. 1, 2012, U.S. Appl. No. 12/901,915", (Oct. 1, 2012).

"Partial International Search Report and Invitation to Pay Additional Fees by the International Searching Authority Dated Feb. 6, 2013, International Application No. PCT/US2012/047805", (Feb. 6, 2013).

Alson, Jeff, et al., "Progress Report on Clean and Efficient Automotive Technologies Under Development at the EPA", *United States Environmental Protection Agency*, EPA420-R-04-002, (Jan. 2004), 198 pp total.

Brueckner, Stephen, "Reducing Greenhouse Gas Emissions From Light-Duty Motor Vehicles", *California Air Resources Board (ARB) Workshop*, (Apr. 20, 2004), pp. 1-37.

Kang, Hyungsuk, et al., "Demonstration of Air-Power-Assist (APA) Engine Technology for Clean Combustion and Direct Energy Recovery in Heavy Duty Application", SAE Technical Paper Series 2008-01-1197, (Apr. 14-17, 2008), 9 pp total.

Nehmer, Daniel A., et al., "Development of a Fully Flexible Hydraulic Valve Actuation Engine, Part I: Hydraulic Valve Actuation System

(56) References Cited

OTHER PUBLICATIONS

Development", *Proceedings of the 2002 Global Powertrain Congress (GPC) on Advanced Engine Design and Performance*, (2002), 12 pp total.

Ricardo, Inc., "A Study of Potential Effectiveness of Carbon Dioxide Reducing Vehicle Technolgies, Revised Final Report", *United States Environmental Protection Agency* EPA420-R-08-004A, EPA Contract No. EP-C-06-003, Work Assignment No. 1-14, (Jun. 2008), 126 pp total.

Sheehan, John, et al., "An Overview of Biodiesel and Petroleum Diesel Life Cycles", A Joint Study Sponsored by: U.S. Department of Agriculture and U.S. Department of Energy, (May 1998), 60 pp total.

Vance, Evelyn, et al., "Advanced Fuel Injection System and Valve Train Technologies", SBIR Phase II Project Final Report, SBIR Contract No. W56HZV-07-C-0528, (Oct. 19, 2009), pp. 1-237.

Yamaguchi, T., et al., "Improvements for Volumetric Efficiency and Emissions using Digital Hydraulic VVA in a High Boosting Diesel Engine", *THIESEL 2008 Conference on Thermo- and Fluid Dynamic Processes in Diesel Engines*, (2008), pp. 1-13.

"Notice of Allowance Mailed Jul. 16, 2013; U.S. Appl. No. 12/901,915", (Jul. 16, 2013).

"Office Action Dated Sep. 6, 2013; U.S. Appl. No. 13/526,914", (Sep. 6, 2013).

"Office Action Dated Dec. 3, 2013; Chinese Patent Application No. 201080054641.5", (Dec. 3, 2013).

"Office Action Dated Feb. 3, 2014; U.S. Appl. No. 13/526,914", (Feb. 3, 2014).

"Office Action Dated Jul. 11, 2014; Chinese Patent Application No. 201080054641.5", (Jul. 11, 2014).

"Office Action Dated Jun. 16, 2014; U.S. Appl. No. 13/554,123", (Jun. 16, 2014).

"Office Action Dated Jun. 23, 2014; U.S. Appl. No. 13/526,914", (Jun. 23, 2014).

\* cited by examiner

US 8,887,690 B1

AMMONIA FUELED MOBILE AND STATIONARY SYSTEMS AND METHODS

CROSS REFERENCE TO RELATED APPLICATIONS

This application claims the benefit pursuant to 35 U.S.C. 119(e) of U.S. Provisional Application No. 61/363,373, filed Jul. 12, 2010, which application is specifically incorporated herein, in its entirety, by reference.

BACKGROUND

1. Field

Embodiments of the invention relate to the field of internal combustion engine and power systems.

2. Background

At the present time, the vast majority of mobile power systems are based on spark ignition and diesel engines of conventional crankshaft and camshaft based configurations using gasoline and diesel fuel, respectively, though some such engines also operate on other fuels, such as compressed natural gas (CNG), alcohol gasoline mixtures and biofuels, to name a few alternatives enjoying some recent adaptation. Also hybrid vehicles have emerged that use a combination of battery power together with typically a spark ignition engine for backup power.

Recently there has been an awareness that carbon dioxide (CO2) appears to be a substantial cause of global warming, with the common use of fossil fuels as a source of power in both mobile and stationary power systems being the major contributor of CO2 to the atmosphere. Hence there is a strong desire to somehow reduce or eliminate the dependence on fossil fuels. There is also a strong desire to somehow store large quantities of energy far exceeding that which might be stored in batteries, and in a mobile form, to store wind power, solar power and the like to use when there is no availability of wind power, solar power (overcast or nighttime) and transport that energy to its point of use. Storing and transporting energy is an important consideration, as the best locations for generation of wind and solar power are usually well away from any existing adequate electrical distribution grid to deliver the energy to its point of use, and no practical way of storing such energy is now in use. Finally, it is recognized that the electrical distribution grid in the US is vulnerable to attack, again emphasizing the desirability of being able to more securely store and physically transport energy from the source of generation to its location of use by pipeline, rail, truck and/or other modes of distribution. The same is true for power generated by nuclear power plants.

One possibility for storage of energy at the time of its generation, and transportation to its point of use, is to use ammonia (NH3) as the energy storage medium. Ammonia is highly toxic, but is currently manufactured in substantial quantities, and is also safely transported and stored, all using well known techniques. Ammonia is particularly attractive for such use because its combustion products are only H2O (water) and N2 (nitrogen), both already in the environment in large quantities, and are the components used to generate ammonia. The combustion products are completely free of CO2, as well as soot and other hydrocarbon byproducts that result from less than totally burned fossil fuel.

The only other non-carbon based fuel currently under consideration for such use is hydrogen. Hydrogen can be generated from water, and returns to the water vapor when used as a fuel, again without generating CO2, or soot and other hydrocarbon byproducts that result from less than totally burned fossil fuel. However hydrogen presents an explosion risk over a wide range of hydrogen-air mixtures, and cannot be stored in any currently practical way to provide a reasonable heat content per unit volume of storage capacity.

SUMMARY

A piston engine is operated to close an exhaust valve, close an intake valve, and inject ammonia into a cylinder at a start of a compression motion of a piston before substantial compression occurs. The ammonia may be injected into the cylinder as a liquid. The ammonia may be pressurized sufficiently to prevent boiling of the ammonia at a temperature of the engine. A mixture of ammonia and air may be compressed sufficiently to obtain compression ignition of the ammonia. An amount of air in the cylinder during compression may be limited to limit combustion temperatures to below the temperatures for formation of $NO_x$. Air may be injected into the cylinder after ignition of the ammonia and during combustion. The exhaust valve may be closed at a time to trap a predetermined amount of exhaust gas in the cylinder.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

In comparison to hydrocarbon fuels, ammonia has a significantly lower heat content (heat of combustion), and requires a more limited air fuel ratio for spark ignition. As a potential fuel for compression ignition engines, ammonia is much more difficult to obtain compression ignition than with diesel fuel. By way of example, in one test, compression ignition did not occur at a compression ratio of 20:1, but did occur at a compression ratio of 50:1. The lower limit of compression ratio for ignition is not well known, but can be expected to vary with operating conditions, such as engine temperature and particularly inlet air temperature. Still, use of ammonia as a fuel in compression ignition engines is preferable because of the greater efficiency of compression ignition engines, particularly advantageous when using a fuel with a lower heat content than prior fuels.

In accordance with the present invention, a hydraulic free piston engine is used, providing both a very high and a variable compression ratio so as to obtain reliable compression ignition throughout its operating regime while attaining high operating efficiency because of the high compression ratio and other attributes.

Figure 1:
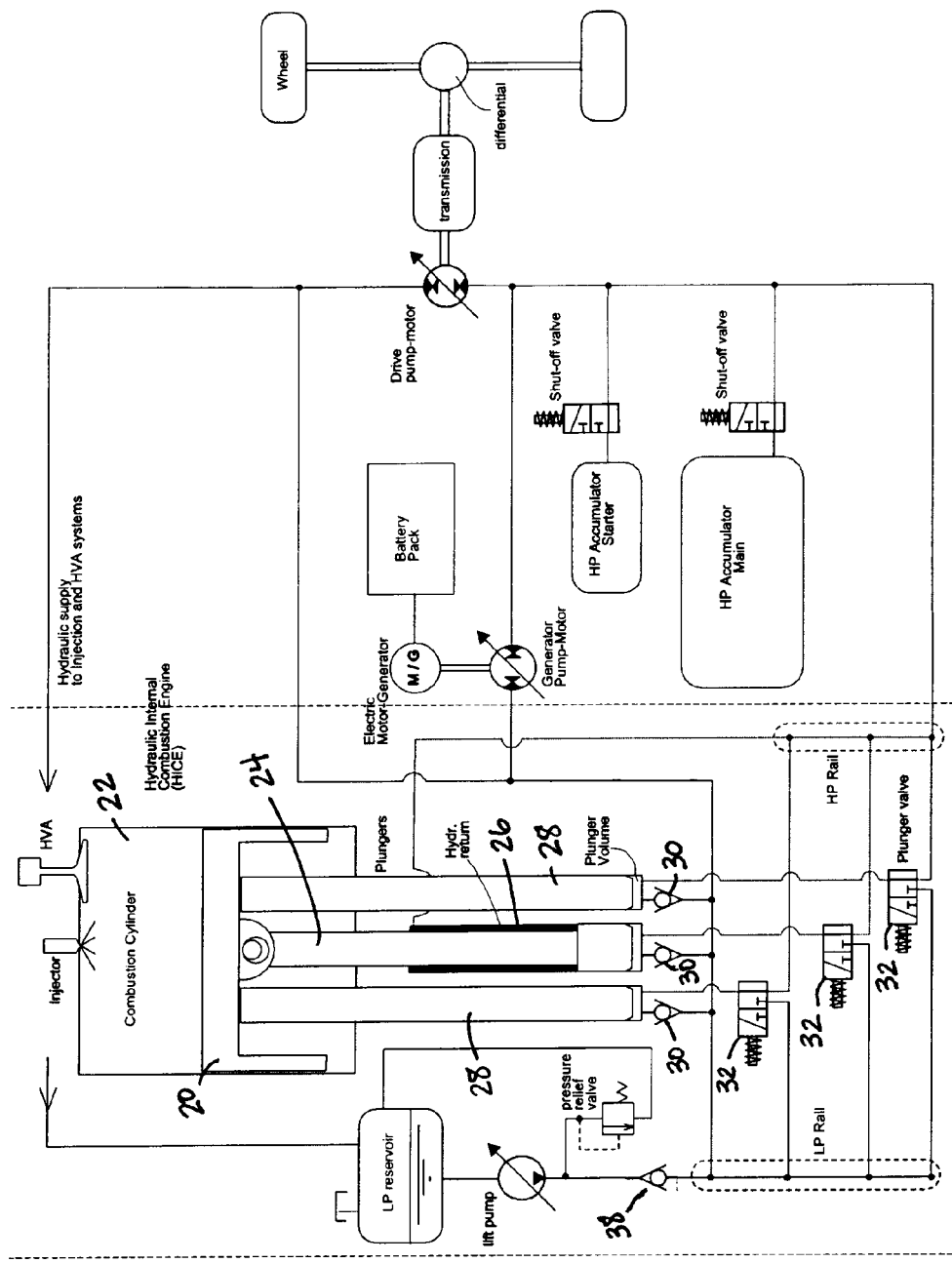
FIG. 1 presents a schematic illustration of one cylinder of an exemplary free piston engine, together with a vehicle drive train in accordance with one embodiment of the present invention.

FIG. 1 presents a schematic view of one cylinder of an exemplary free piston engine, together with a vehicle drive train in accordance with one embodiment of the present invention. In that Figure, a piston 20 is disposed in a combustion cylinder 22 with a central hydraulic piston 24 attached thereunder. Note that the central hydraulic piston 24 has a somewhat enlarged lower end so that hydraulic pressure in region 26 may be used to draw the piston 20 in the combustion cylinder 22 downward. There are also shown two additional hydraulic pistons 28 at each side of the central hydraulic piston 20.

Figure 2:
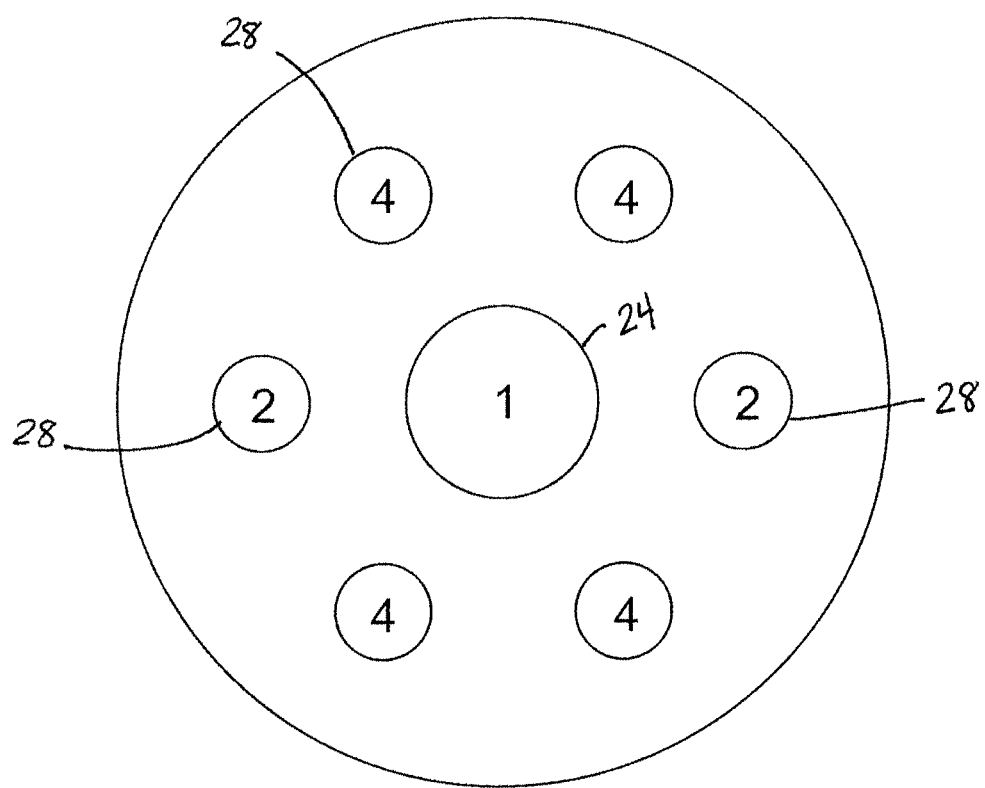
FIG. 2 illustrates the multiple hydraulic pistons used for each free piston in a hydraulic free piston engine in accordance with one embodiment of the present invention.

Actually, as may be seen in FIG. 2, a total of seven hydraulic pistons 24, 28 are used in this embodiment, though a greater or lesser number may be used as desired. Referring again to FIG. 1, each of the hydraulic pistons 24, 28 is coupled to a low pressure rail (LP RAIL) through check valves 30 and to either a high pressure rail (HP RAIL) or back to the low pressure rail through a three-way valve 32.

The pressure in the low pressure rail (LPRAIL) will be relatively low, though high enough to backfill the hydraulic pistons 24 and 28 during the upward motion of the piston 20 in the combustion cylinder 22. The pressure in the high pressure rail (HPRAIL), on the other hand, will be quite high. As shown in FIG. 1, in this embodiment, high pressure hydraulic fluid is always disposed over the bulge in the central hydraulic piston to bias the same downward, though this pressure could be a controlled pressure if desired.

A key to the present invention is the use of the multiple hydraulic pistons 24 and 28 in an ammonia based combustion process. In particular, for the intake stroke, the control valves 32 are set to couple all of the hydraulic pistons 24 and 28 to the low pressure rail, with high pressure being coupled over the enlarged bottom portion of the central hydraulic piston 24 to pull the piston down in the combustion cylinder 22.

For the compression stroke, the control valve 32 for the central piston couples the same to the high pressure rail to force the piston upward, with fuel, in this case ammonia, being injected as shall be subsequently be described.

For the downward movement of the piston 20 in the combustion cylinder 22 in the power stroke following combustion, the control valves 32 are used to couple, first, all of the hydraulic pistons 28 to the high pressure rail during the first part of the downward motion of the piston 20 in the combustion cylinder 22, and then to couple increasing numbers of hydraulic pistons 28 (in a physically balanced manner) to the low pressure rail as the pressure in the combustion cylinder 22 drops due to the downward motion of the piston 20, until the piston 20 stops at the equivalent of a bottom dead center piston position.

At about this point the exhaust valve 46 or valves are opened using in this embodiment, one or more electronically controlled hydraulically actuated (HVA) engine valves, and hydraulic pressure under central piston 24 is used to move the piston 20 in the combustion cylinder 22 upward for the exhaust stroke. The pressure in the low pressure rail may be adequate for this purpose, though to accelerate the piston 20 in the combustion cylinder upward, the lower end of central piston 24 may be momentarily coupled to the high pressure rail.

With respect to the use of the multiple hydraulic pistons 24, 28, note from FIG. 2 that the three control valves 32 shown in FIG. 1 control the coupling to the high pressure rail of 1) the central hydraulic piston, 2) the two side hydraulic pistons labeled 2, and 3), the four pistons labeled 4. Thus the valves control the hydraulic force (and hydraulic pumping rate) that may be exerted on the piston 20 in the combustion cylinder 22 to oppose the combustion cylinder pressures after ignition. This, in effect, provides a staircase type decrease in hydraulic force and pumping rate to the high pressure rail as the pressure in the combustion cylinder decreases. The difference between the staircase force and force on the piston 20 in the combustion cylinder 22 is absorbed by piston acceleration or deceleration.

Thus the use of multiple hydraulic pistons 24, 28 coupled with the control of the destination of the hydraulic fluid thereunder allows control of the position, motion and velocity of the piston 20 in the combustion cylinder 22 for the most efficient delivery of the energy to the high pressure rail and a high pressure accumulator coupled thereto.

In a free piston engine, by definition there is no predefined piston position or motion, and in particular, piston velocities and piston extreme positions, as there is for a piston in a crankshaft type engine. Piston extreme positions can be varied, which has the advantage of allowing adjustment of compression ratio in a compression ignition engine as required to obtain ignition at or near top dead center, independent of the temperature of the intake air. However it is essential to know the position and velocity of a free piston in a free piston engine so that velocity extremes may be avoided, and piston extreme positions can be predefined or at least controlled and varied as desired.

Figure 3:
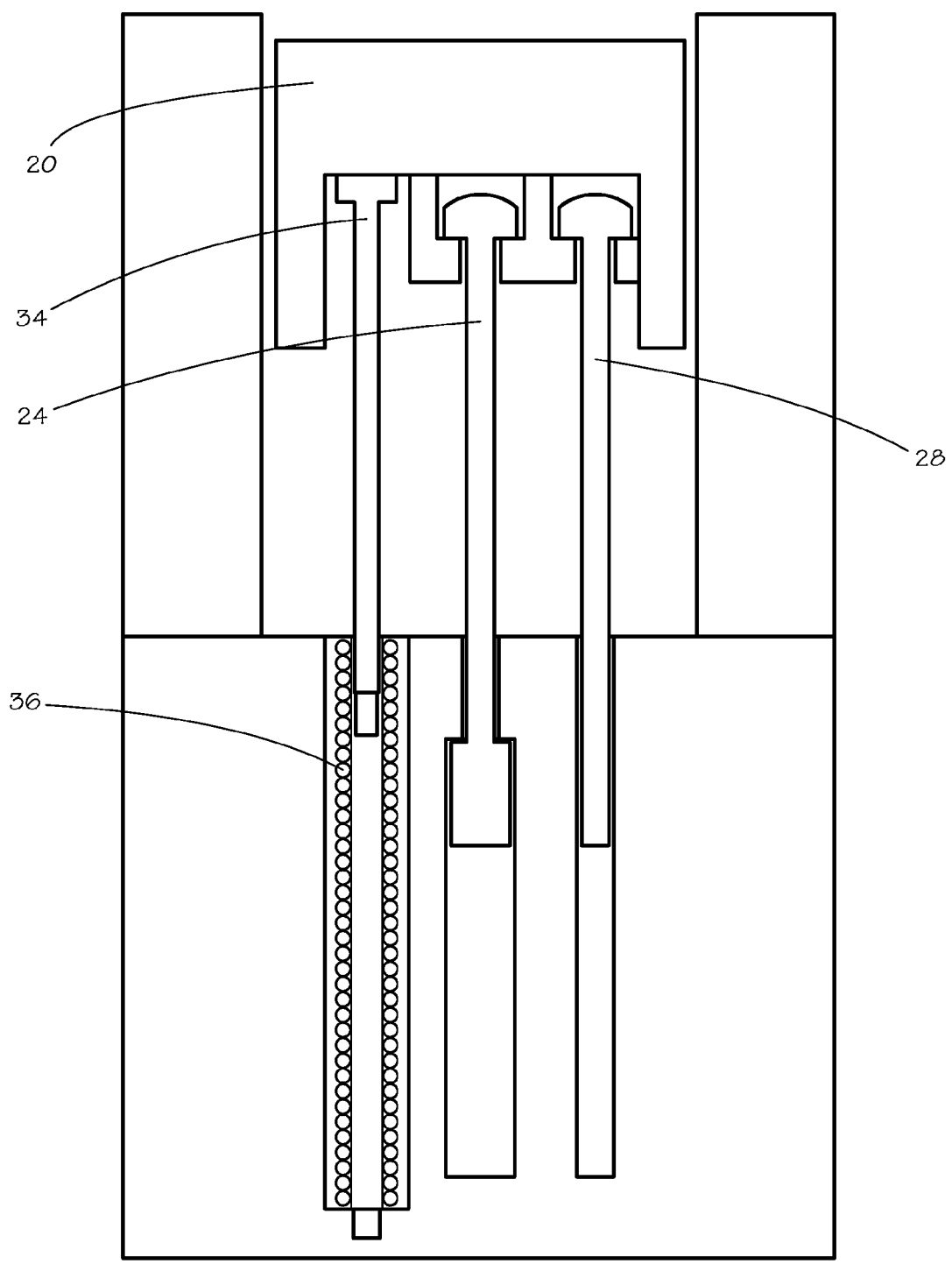
FIG. 3 schematically illustrates a free piston position sensing system that may be used in a free piston engine in accordance with one embodiment of the present invention.

Accordingly, FIG. 3 schematically illustrates a free piston position sensing system that may be used for this purpose. In particular, the free piston 20 on a downward motion of a power stroke pumps hydraulic fluid using a variable number of hydraulic pistons 24 and 28 as hereinbefore described to control the velocity of the free piston 20. Center hydraulic piston 24, on the other hand, provides a free piston return capability as well as an intake stroke capability as hereinbefore described.

For piston position sensing, however, a magnetic steel plunger 34 is used together with a coil 36 which is excited with a relatively high frequency AC signal. The impedance of the coil will vary with the position of the magnetic plunger 34. While the variation in impedance with plunger position may not be linear and/or the circuitry for sensing the impedance may not be linear, a calibration curve may readily be applied to linearize the output signal with piston position. In that regard, since the free piston engine is processor controlled, the calibration may easily be done in the digital domain by converting the nonlinear signal to a digital signal through an analog-to-digital converter and then linearized by way of a lookup table to provide true piston position in digital form for use by the free piston engine digital controller. Obviously FIG. 3 is a schematic diagram, though illustrates the principles of an exemplary free piston position sensor, though other sensors, such as, by way of example, Hall effect sensors may be used.

Referring again to FIG. 1, it may be seen that the low pressure rail is supplied with hydraulic fluid from the low pressure reservoir through a lift pump, typically a positive displacement pump, with the output pressure thereof being controlled by an on/off valve coupling the output of the lift pump back to the low pressure reservoir when needed to control the volume of flow and the outlet pressure delivered to the low pressure rail, with check valve 38 preventing back flow from the low pressure rail when the pressure relief valve is open. The high pressure rail, in addition to being coupled to an output of control valves 32 and to region 26 around the central piston 24, is also coupled through an electrically coupled shutoff valve to a high pressure accumulator for the main storage of high pressure hydraulic fluid, to a smaller high pressure accumulator for starting purposes, to a drive pump motor coupled to a differential driving two wheels of the vehicle through a transmission, and to a generator pump-motor.

The fluid output of the drive pump-motor, still having a significant pressure, can be used as the hydraulic supply to power the injection and hydraulic valve actuation (HVA) systems, as well as for return to the low pressure rail. The generator pump-motor, when the engine is running, drives an electric motor-generator for charging a battery pack, though for starting purposes the battery pack may drive the electric motor-generator, which in turn will mechanically drive the generator pump-motor to pressurize the low pressure rail, with the high pressure accumulator starter being coupled to the high pressure rail through the respective shutoff valve to provide the required high pressure rail pressure, particularly for the compression stroke. The drive pump-motor coupled to the transmission, of course, acts as a motor to drive the wheels through the transmission and differential for accelerating and maintaining the speed of the vehicle, though when braking or going downhill, the differential and transmission may actually drive the pump-motor, which can be used to store energy in the main high pressure accumulator for future use as a short term power boost, by taking hydraulic fluid from the low pressure rail and delivering high pressure hydraulic fluid to the main high pressure accumulator.

The electronically controllable valve actuation system may be a hydraulic valve actuation system controlled by spool valves of the general type disclosed in one or more of U.S. Pat. No. 6,739,293 entitled "Hydraulic Valve Actuation Systems and Methods", U.S. Pat. No. 7,025,326 entitled "Hydraulic Valve Actuation Methods and Apparatus", U.S. Pat. No. 7,341,028 entitled "Hydraulic Valve Actuation Systems and Methods to Provide Multiple Lifts for One or More Engine Air Valves", U.S. Pat. No. 7,387,095 entitled "Hydraulic Valve Actuation Systems and Methods to Provide Variable Lift for One or More Engine Air Valves", U.S. Pat. No. 7,730,858 entitled "Hydraulic Valve Actuation Systems and Methods to Provide Variable Lift for One or More Engine Air Valves", U.S. Pat. No. 6,308,690 entitled "Hydraulically Controllable Camless Valve System Adapted for an Internal Combustion Engine", U.S. Pat. No. 6,557,506 entitled "Hydraulically Controlled Valve for an Internal Combustion Engine" and U.S. Pat. No. 6,575,126 entitled "Solenoid Actuated Engine Valve for an Internal Combustion Engine". These patents disclose hydraulic valve actuation systems primarily intended for engine valves such as but not limited to intake and exhaust valves, and include, among other things, methods and apparatus for control of engine valve acceleration and deceleration at the limits of engine valve travel as well as variable valve lift.

Figure 4:
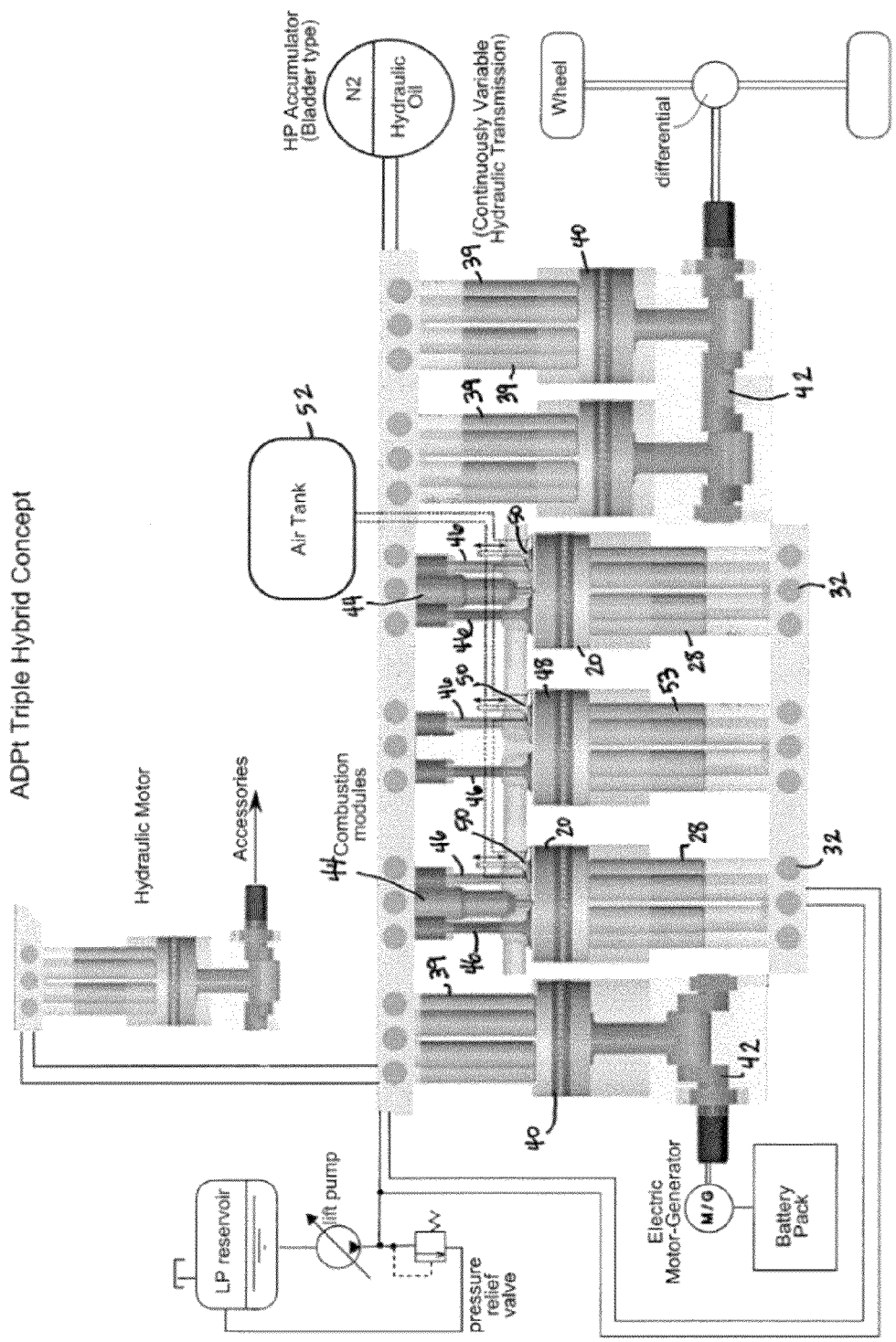
FIG. 4 is a schematic representation of one embodiment of a multi-cylinder free piston engine and drive pump-motor combination that may be used with the present invention.

Now referring to FIG. 4, a schematic representation of one embodiment of a multi-cylinder free piston engine and drive pump-motor combination that may be used with the present invention may be seen. In FIG. 4 two cylinders, the combustion cylinders, contain free pistons 20 and hydraulic pistons 28, as well as three control valves 32 for each set of hydraulic pistons 28 for each free piston 20 (see also FIG. 1). Three additional cylinders make use of the high pressure hydraulic fluid provided by pistons 28 by powering selected ones of additional hydraulic pistons 39, driving pistons 40 to turn crankshaft 42 to power the wheels of the vehicle through a differential. In this embodiment the transmission of FIG. 1 is eliminated, the required torque being achieved by powering all of pistons 39 when necessary, though a transmission and/or two-speed differential may be used if desired. A separate hydraulic motor may be used to provide a mechanical power source at a speed independent of the speed of rotation by the crankshaft 42 to power the accessories when the vehicle is stopped or operating at a low speed. Of course, the amount of power provided by pistons 39 depends on the number of such pistons being coupled to the high pressure rail (FIG. 1) as opposed to the low pressure rail at any given time.

Shown in FIG. 4 are the fuel injectors 44 for injecting ammonia, and intake and exhaust valves 46 for the combustion cylinders. The liquid fuel injectors may be intensifier type fuel injectors electronically controlled through spool valves of the general type disclosed in one or more of U.S. Pat. No. 5,460,329 entitled "High Speed Fuel Injector", U.S. Pat. No. 6,257,499 entitled "High Speed Fuel Injector", U.S. Pat. No. 5,720,261 entitled "Valve Controller Systems and Methods and Fuel Injection Systems Utilizing the Same", U.S. Pat. No. 5,954,030 entitled "Valve Controller Systems and Methods and Fuel Injection Systems Utilizing the Same", U.S. Pat. No. 6,005,763 entitled "Pulsed-Energy Controllers and Methods of Operation Thereof", U.S. Pat. No. 6,012,644 entitled "Fuel Injector and Method Using Two, Two-Way Valve Control Valves", U.S. Pat. No. 6,085,991 entitled "Intensified Fuel Injector Having A Lateral Drain Passage", U.S. Pat. No. 6,161,770 entitled "Hydraulically Driven Springless Fuel Injector", U.S. Pat. No. 7,032,574 entitled "Multi-Stage Intensifiers Adapted for Pressurized Fluid Injectors", U.S. Pat. No. 7,108,200 entitled "Fuel Injectors and Methods of Fuel Injection", U.S. Patent Application Publication No. 2007/0007362 entitled "Fuel Injectors and Methods of Fuel Injection", U.S. Pat. No. 7,412,969 entitled "Direct Needle Control Fuel Injectors and Methods", U.S. Pat. No. 7,568,633 entitled "Digital Fuel Injector, Injection and Hydraulic Valve Actuation Module and Engine and High Pressure Pump Methods and Apparatus", U.S. Patent Application Publication No. 2009/0199819 entitled "Digital Fuel Injector, Injection and Hydraulic Valve Actuation Module and Engine and High Pressure Pump Methods and Apparatus", U.S. Pat. No. 7,717,359 entitled "Multiple Intensifier Injectors with Positive Needle Control and Methods of Injection", U.S. Patent Application Publication No. 2010/0186716 entitled "Multiple Intensifier Injectors with Positive Needle Control and Methods of Injection", U.S. Pat. No. 7,568,632 entitled "Fuel Injector with Boosted Needle Closure", U.S. Pat. No. 7,694,891 entitled "Fuel Injector with Boosted Needle Closure" and U.S. Patent Application Publication No. 2010/0012745 entitled "Fuel Injectors with Intensified Fuel Storage and Methods of Operating an Engine Therewith". These patents disclose electronically controllable intensifier type fuel injectors having various configurations, and include direct needle control, variable intensification ratio, intensified fuel storage and various other features.

Also shown in the combustion cylinders containing free pistons 20, as well as the cylinder containing a compression piston 48, is an additional valve 50 coupled to a high pressure air tank 52. The compression piston 48 is powered by a further set of hydraulic pistons 53 and a central piston (not visible in FIG. 4) corresponding to piston 26 of FIG. 1. Thus piston 48 may act as a compression piston, bringing intake air in through valves 46 on its downward movement for compression on its upward movement, and allowing compressed air out to the air tank 52 through valve 50 appropriately controlled for such purpose, or alternatively, through a suitable check valve. The compression cylinder operates on a single downward and upward movement (two strokes). Thus high pressure air in the air tank 52 is available for injection into the combustion cylinder containing free pistons 20 using one or more operating cycles to be subsequently described.

The free piston engine, using ammonia as a fuel in accordance with the present invention, may be operated using various operating cycles, including any of the operating cycles disclosed in described in U.S. Pat. Nos. 6,415,749 and 7,793,638, U.S. Patent Application Publication Nos. 2008/0264393 and 2009/0183699 and U.S. patent application Ser. No. 12/256,296, the disclosures of which are herein incorporated by reference.

Figure 5:
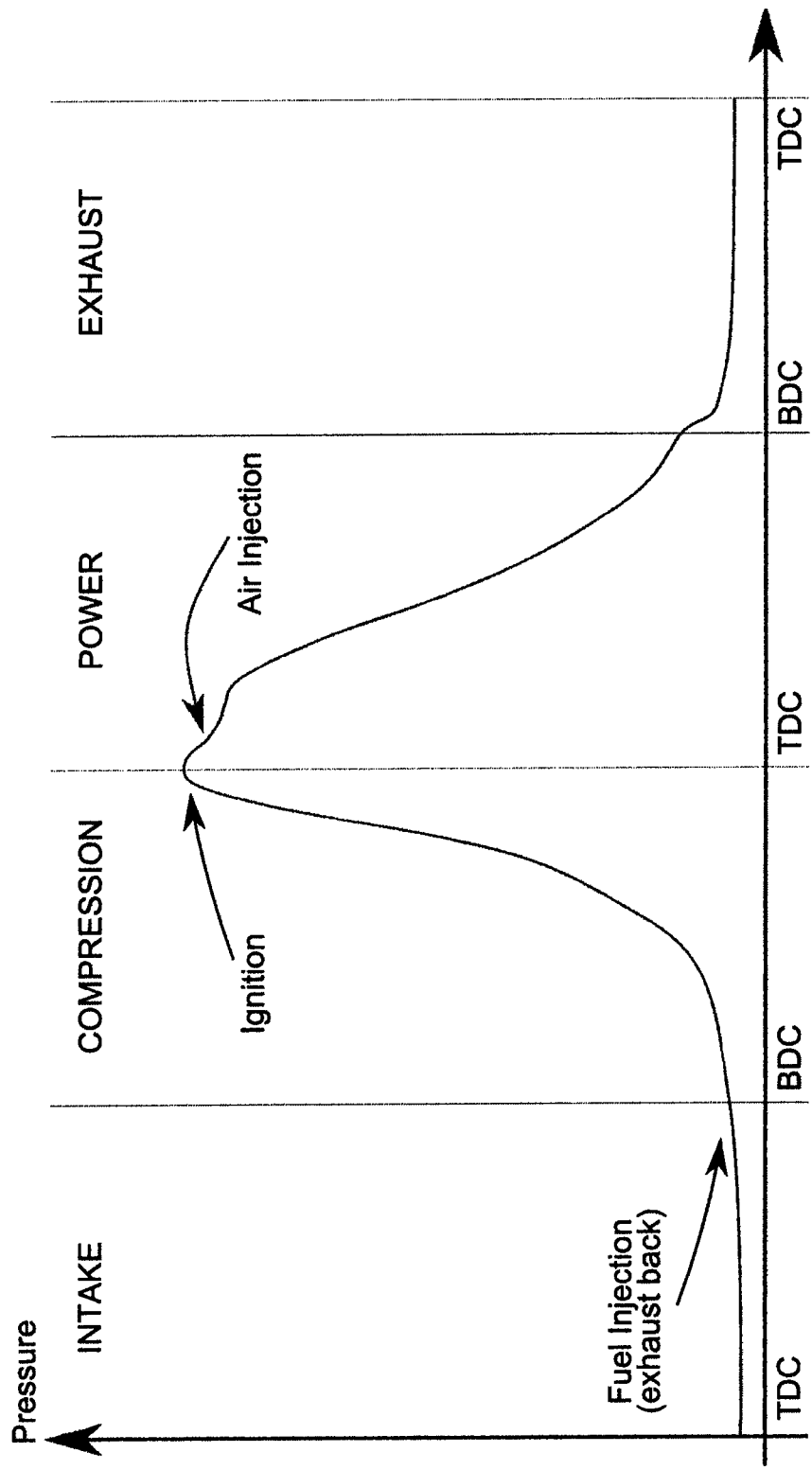
FIG. 5 schematically illustrates one particularly attractive cycle of operation of the present invention.

However, one particularly attractive cycle of operation, referred to herein as "the Sturman cycle", is schematically shown in FIG. 5. This Figure presents a schematic plot of pressure in the combustion cylinder versus piston position ranging from top dead center (TDC) to bottom dead center (BDC). It should be noted, however, that for a free piston engine top dead center and bottom dead center are not positively defined like they are in a crankshaft type piston engine. Instead, they are defined as the piston position at which the direction of piston motion reverses. While the bottom dead center position may be reasonably well defined and fixed, the top dead center piston position in the free piston engine of the present invention will more likely vary depending on operating conditions, as required to obtain compression ignition at or near the top dead center position. Thus the engine may operate at a higher compression ratio when the engine is cold and/or the ambient air temperature is low, in comparison to the operating compression ratio when the engine is warmed up and/or the ambient air temperature is higher.

In accordance with the operating cycle shown in FIG. 5, some fresh air is drawn into the combustion chamber during the intake motion of the free piston, followed by the intake of some hot exhaust gasses in the exhaust manifold before the end of the intake motion. Alternatively, of course, hot exhaust gasses may be left in the combustion chamber by the early closure of the exhaust valve during the prior exhaust motion of the free piston, followed by some ingestion of fresh air near the end of the intake motion prior to the free piston reaching the bottom dead center position. As a still further alternative, enough oxygen may be left in the exhaust gas to negate the need for any fresh air intake during the intake motion of the free piston.

At or near the bottom dead center position, after both the intake and exhaust valves are closed, ammonia is injected into the combustion chamber. In the Sturman cycle, all ammonia to be injected during this combustion cycle is injected at or near the bottom dead center position of the free piston, or at least before substantial compression occurs. This causes the ammonia to quickly turn into its gaseous form because of the combination of relatively low pressure and high temperature of the exhaust gas/air mixture in the combustion chamber at that time. This, of course, in part takes advantage of the relatively low boiling point of ammonia. In that regard, the ammonia is preferably injected into the combustion chamber as a liquid, though as stated, will substantially immediately change to a vapor state because of the combination of pressure and temperature. Because of this rapid change in phase, the degree of atomization of the ammonia during injection is far less critical than in a typical diesel engine, and accordingly, may or may not use an intensifier type injector, but might be directly injected using the pressure of an ammonia fuel rail. While the liquid ammonia fuel will be stored in a fuel tank under pressure, the ammonia pressure needs to be substantially increased by an appropriate fuel pump before proceeding to the injectors, as otherwise the increased temperatures encountered in or near the engine will cause boiling at the fuel tank pressure and convert the ammonia to a gaseous form, blowing the same back toward the fuel tank.

Of course, as an alternative, if desired, the ammonia may be intentionally "injected" into the combustion cylinder in a gaseous form, using an appropriate injector means, such as a small poppet valve. In any event, during compression, the already quite warm contents of the combustion chamber at the beginning of compression undergoes a gross temperature increase until ignition of the ammonia occurs at or near top dead center.

At ignition, the pressure and temperature rise is purposely limited by the limited fresh air (oxygen) in the combustion chamber, in part to avoid reaching combustion chamber temperatures at which NOX is formed, and in part to allow the free piston to start its downward power motion, during which high pressure air from the high pressure air tank 52 (FIG. 4) is injected to sustain combustion during that motion and substantially maintain combustion chamber pressure for efficient conversion of the pressure energy to hydraulic energy by the hydraulic pistons 22 and 28 (FIGS. 1 and 4). This combination of limited pressure and temperature rise on ignition, together with sustained combustion well out into the power motion of the free piston, helps limit the maximum velocity of the free pistons and thus maximize the energy transfer to hydraulic energy while holding hydraulic flow losses to a minimum.

After the power motion of the free piston, the exhaust valve will be opened at or near the bottom dead center position to exhaust most of the exhaust gasses in the combustion chamber (unless the exhaust valve is purposely closed early to trap additional exhaust gas in the combustion chamber), followed by the intake motion as previously described. Note that while the bottom dead center position between the intake and compression motion of the free piston and the bottom dead center between the power and exhaust motion of the free piston can normally be the same or similar piston position, the top dead center position between the compression and power motion of the free piston may intentionally be different from the top dead center position of the free piston between the exhaust and intake motion of the free piston.

In particular, the top dead center position between the exhaust and intake motion of the free piston may, for convenience, be a substantially fixed free piston position, though the top dead center position between compression and power motion of the free piston may intentionally be varied as required to obtain compression ignition of the ammonia in the combustion chamber. It is this ability to vary the compression ratio in an electronically controlled free piston engine that makes the same particularly attractive for use with ammonia as the fuel. Note that a top center position of a free piston in its cylinder can represent a very high compression ratio when necessary for compression ignition. This is because no valves are open at this time, and unlike a conventional compression ignition engine where fuel is injected at or near top dead center, any injector nozzle projecting into the free piston combustion chamber is not active at this time, so can fit into a recess in the top of piston without effecting its proper operation when the piston is not at or near the top dead center position. Also, for cold starts, the velocity of the free piston in its compression motion can be increased from that used for normal operation, thereby allowing free piston inertia to aid in the final phase of the compression. These capabilities highlight one of the advantages of a free piston engine when using ammonia as a fuel.

Figure 6:
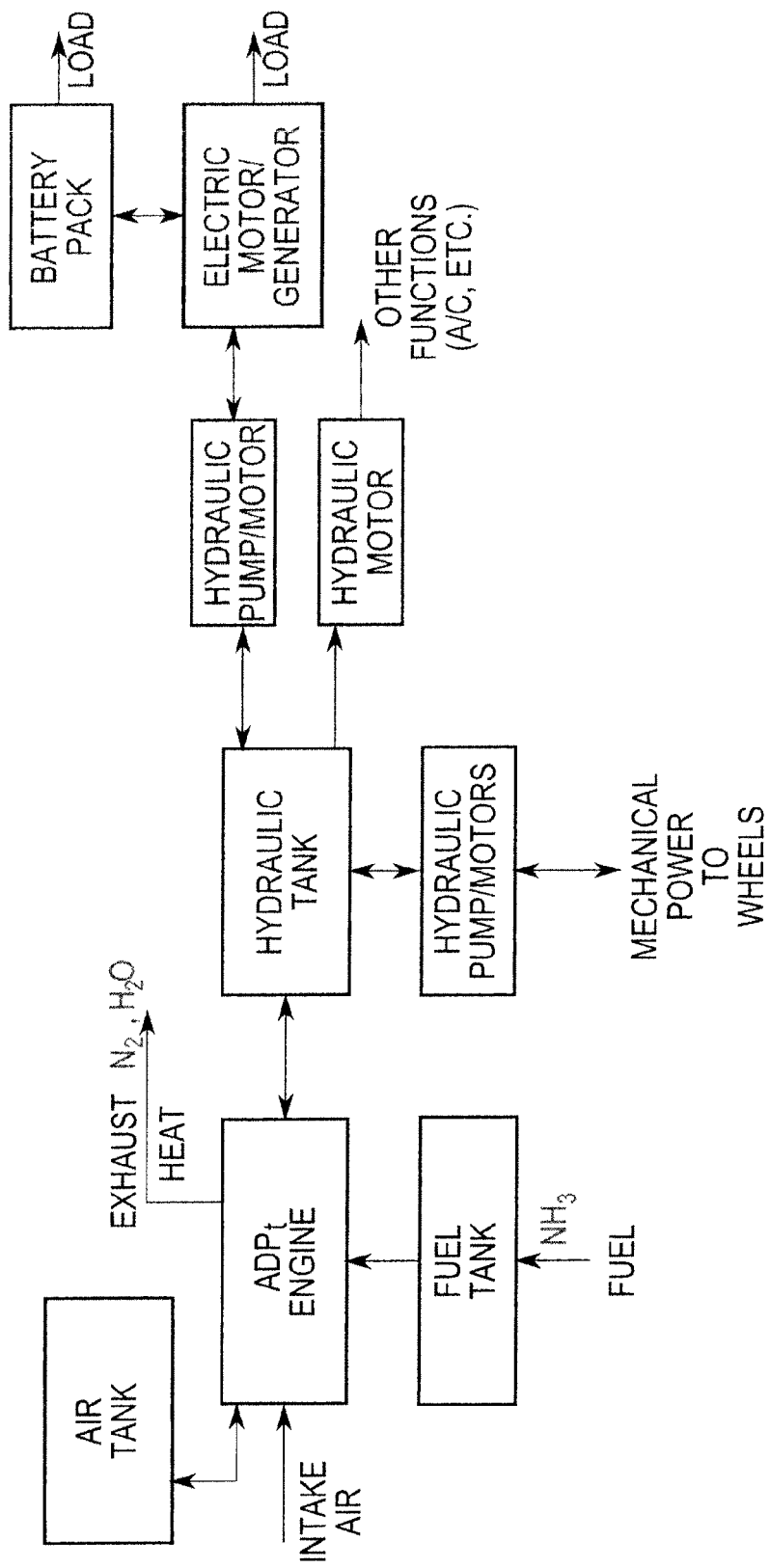
FIG. 6 is a block diagram illustrating a triple hybrid mobile power system that burns ammonia, when necessary, yet generates no CO2 in the combustion process.

Now referring to FIG. 6, a block diagram illustrating a triple hybrid mobile power system having a carbon free exhaust incorporating the present invention may be seen. Here a free piston engine labeled ADP$_t$™ (a trademark of Sturman Digital systems) Engine receives intake air and ammonia as fuel from the fuel tank, and compresses air for injection in an operating cycle such as that shown in FIG. 5 for temporary storage in the air tank for injection. The free piston engine provides hydraulic energy to a high pressure hydraulic storage tank or accumulator (a low pressure storage or reservoir not being shown). The hydraulic energy storage in the hydraulic tank is used to power hydraulic pump/motors to provide mechanical power to the wheels of the vehicle, with the wheels in turn providing power to the hydraulic pump during braking to recover kinetic energy from the moving vehicle and store the same as hydraulic energy in the hydraulic tank. In that regard, note that one of the features of a free piston engine of the type described herein is that the same may operate at substantially any cycle repetition rate, including zero. Thus during braking or other times when the hydraulic tank contains sufficient hydraulic energy to meet current needs, the free piston engine may be stopped, though essentially immediately restarted at up to its maximum power output, as needed.

The high pressure hydraulic fluid stored in the hydraulic tank may also be used to power another hydraulic pump/motor, which in turn may power an electric motor/generator to charge a battery pack, which may be used at other times to power the electric motor/generator to drive a load, such as providing an alternate form of drive to the vehicle wheels. In this system, still another hydraulic motor coupled to the high pressure hydraulic tank may be used to provide mechanical power for other purposes, such as operation of a vehicle air conditioner. In any event, the exhaust from the free piston engine operating on ammonia as a fuel is simply nitrogen and water vapor, plus of course some residual heat in that exhaust. Consequently, no carbon dioxide or soot or other particulate matter is released into the atmosphere. Also, by limiting combustion temperatures, which is not difficult to do using ammonia as a fuel because of its lower heat content, the exhaust of the free piston engine will contain no NOX.

Figure 7:
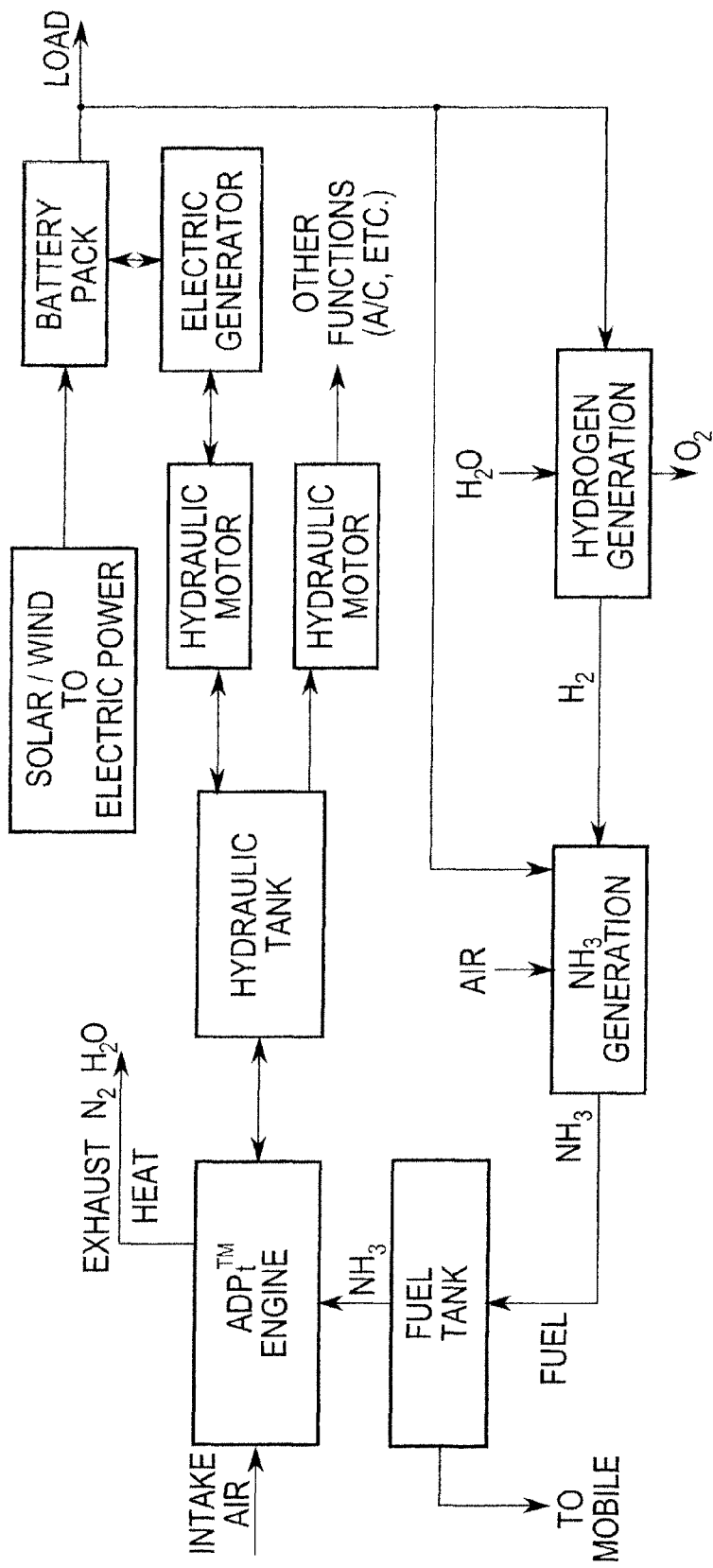
FIG. 7 is a block diagram illustrating a stationary power system that burns ammonia, when necessary, yet generates no CO2 in the combustion process, and could be used commercially to produce ammonia based in electrical power from a wind or solar cell farm.

A system incorporating the present invention in a stationary power plant may be seen in FIG. 7. This system is similar to that of FIG. 6, though rather than driving the wheels of a vehicle, provides electrical output to a load, and a mechanical output through a hydraulic motor for other similarly located functions such as air conditioning, mechanical operation of ventilation fans, etc. Also, unlike the typical mobile power system, a stationary system may accept electrical power from solar/wind sources to also charge the battery pack and provide electrical power to the load. At times when the solar and wind electrical power generation exceeds that needed by the load, the excess electrical power can be used to drive a hydrogen generator, with the output of the hydrogen generator being provided to an ammonia generator to generate ammonia that can be stored in the fuel tank for future use and/or removed from the fuel tank and transported for use elsewhere, such as in a mobile system incorporating the present invention as in FIG. 6. Such a system would be particularly advantageous in areas having a relatively reliable windy condition and/or a particularly sunny area having substantial solar cell area exposed to the sun. That generation of ammonia can easily exceed the system's consumption of ammonia, and in a major solar or wind power installation, can be used on a commercial basis for the production of ammonia for shipment as a fuel, while providing local power when solar and/or wind power is not available.

Thus the present invention has a number of aspects, which aspects may be practiced alone or in various combinations or sub-combinations, as desired. While a embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of operating a cylinder of an ammonia fueled piston engine, the method comprising:
   closing an exhaust valve during an exhaust motion of a piston in the cylinder of the piston engine;
   closing an intake valve during an intake motion of the piston to limit an amount of air in the cylinder during a compression motion of the piston; and
   injecting ammonia into the cylinder at a start of the compression motion of the piston;
   the limited amount of air in the cylinder during the compression motion of the piston limiting combustion temperatures on ignition of the injected ammonia to below the temperatures for formation of $NO_x$;
   injecting air into the cylinder after ignition of the ammonia and during combustion in a power motion of the piston.

2. The method of claim 1 further comprising injecting ammonia into the cylinder as a liquid.

3. The method of claim 2 further comprising pressurizing the ammonia sufficiently to prevent boiling of the ammonia at a temperature of the engine.

4. The method of claim 1 further comprising compressing a mixture of ammonia and air during the compression motion of the piston sufficiently to obtain compression ignition of the ammonia.

5. The method of claim 1 wherein the exhaust valve is closed at a time to trap a predetermined amount of exhaust gas in the cylinder.

6. An ammonia fueled piston engine comprising:
   means for closing an exhaust valve during an exhaust motion of a piston in a cylinder of the piston engine;
   means for closing an intake valve during an intake motion of the piston, including means for limiting an amount of air in the cylinder during a compression motion of the piston; and
   means for injecting ammonia into the cylinder at a start of a compression motion of the piston;
   the means for limiting an amount of air in the cylinder during a compression motion of the piston limiting combustion temperatures on ignition of the injected ammonia to below the temperatures for formation of $NO_x$;
   means for injecting air into the cylinder after ignition of the ammonia and during combustion in a power motion of the piston.

7. The piston engine of claim 6 wherein the means for injecting ammonia into the cylinder injects the ammonia as a liquid.

8. The piston engine of claim 7 further comprising means for pressurizing the ammonia sufficiently to prevent boiling of the ammonia at a temperature of the engine.

9. The piston engine of claim 6 further comprising means for compressing a mixture of ammonia and air to obtain compression ignition of the ammonia.

10. The piston engine of claim 6 wherein the means for closing the exhaust valve closes the exhaust valve at a time to trap a predetermined amount of exhaust gas in the cylinder.

11. A controller that operates a cylinder of an ammonia fueled piston engine, the controller performing operations comprising:
   closing an exhaust valve during an exhaust motion of a piston in the cylinder of the piston engine;
   closing an intake valve during an intake motion of the piston, including limiting an amount of air in the cylinder during a compression motion of the piston;
   injecting ammonia into the cylinder at a start of a compression motion of the piston;
   the limiting of the amount of air in the cylinder during the compression motion of the piston limiting combustion temperatures on ignition of subsequently injected ammonia to below the temperatures for formation of NOx; and
   injecting air into the cylinder after ignition of the ammonia and during combustion in a power motion of the piston.

12. The controller of claim 11 performing operations further comprising injecting ammonia into the cylinder as a liquid.

13. The controller of claim 12 performing operations further comprising pressurizing the ammonia sufficiently to prevent boiling of the ammonia at a temperature of the engine.

14. The controller of claim 11 performing operations further comprising compressing a mixture of ammonia and air during the compression motion of the piston sufficiently to obtain compression ignition of the ammonia.

15. The controller of claim 11 performing operations wherein the exhaust valve is closed at a time to trap a predetermined amount of exhaust gas in the cylinder.

16. The method of claim 1 further comprising opening the exhaust valve during the intake motion of the piston to intake a predetermined amount of exhaust gas in the cylinder.

17. The piston engine of claim 6 further comprising means for opening the exhaust valve during the intake motion of the piston to intake a predetermined amount of exhaust gas in the cylinder.

18. The controller of claim 11 wherein the exhaust valve is opened during the intake motion of the piston to intake a predetermined amount of exhaust gas in the cylinder.

* * * * *